March 26, 1963 M. M. ARLIN 3,082,977
PLURAL ROTOR SUSTAINED AIRCRAFT
Filed July 6, 1960 2 Sheets-Sheet 1

INVENTOR.
Max M. Arlin.
BY
Harness, Dickey & Pierce
ATTORNEYS.

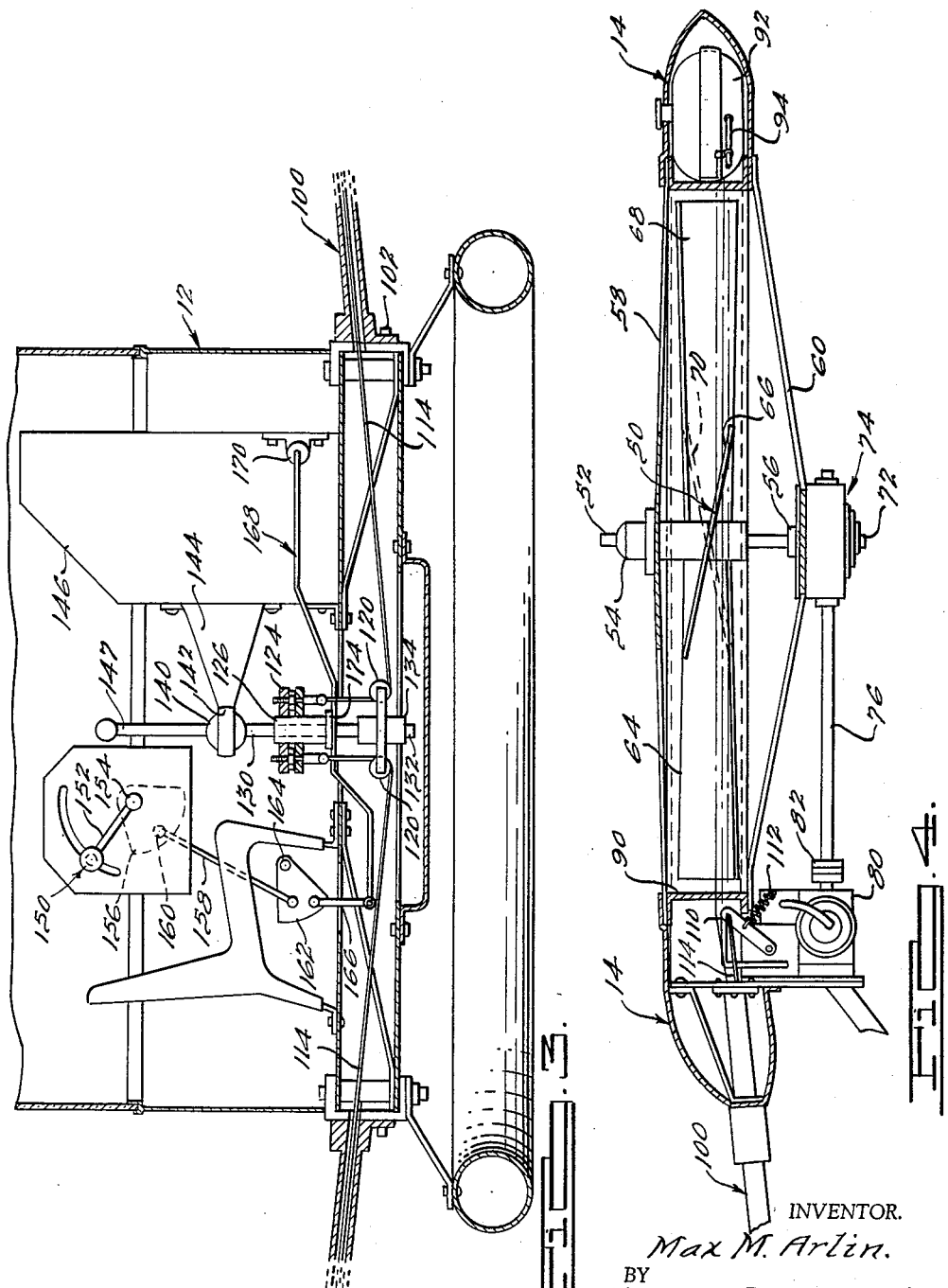

United States Patent Office 3,082,977
Patented Mar. 26, 1963

3,082,977
PLURAL ROTOR SUSTAINED AIRCRAFT
Max Melvin Arlin, 514 Santa Monica Blvd.,
Santa Monica, Calif.
Filed July 6, 1960, Ser. No. 41,093
2 Claims. (Cl. 244—17.23)

This invention relates generally to aircraft and more particularly to a multiple rotor aircraft capable of both vertical and horizontal flight.

Vertically rising aircraft, heretofore known and used, often utilize one or more horizontally orientated propellers to directly effect a vertical component of thrust. However, such know aircraft characteristically require relatively complex mechanisms to translate such vertical thrust into thrust having a horizontal component. Often a horizontal thrust component is obtained by tilting the axes of rotation of the propellers about a horizontal axis, or, as found in the conventional helicopter, by varying the pitch of the rotor blades as the blades rotate, the pitch changing at preselected arcuate positions during each revolution. Alternatively, a horizontal thrust component has been obtained by complex shrouding or ducting of the vertically moving air mass. Each of the aforementioned expedients is relatively complex and subject to failure and inherently increases the total weight of the aircraft.

The present invention is directed to an aircraft having a plurality of rotors for effecting vertical thrust, the horizontal thrust component necessary for movement of the aircraft with respect to the earth being effected by varying the relative thrust of selected ones of the rotors thereby to reorientate the entire aircraft with respect to the vertical.

Accordingly, the principal object of the present invention is an improved aircraft capable of both vertical and horizontal flight.

Another object of the present invention is an aircraft having a plurality of horizontally orientated rotors spaced in a polygonal array with respect to the center of gravity of the aircraft.

Another object of the invention is an aircraft having a plurality of spaced rotors, and means for varying the thrust of selected ones thereof to effect horizontal movement of the aircraft.

Another object is to provide a multiple rotor aircraft having a relatively simple control system for effecting control of the thrust of the rotors.

Other objects and advantages of the present invention will become apparent from the following specification wherein reference is made to the drawings in which:

FIG. 3 is a cross-sectional view taken substantially along the line 3—3 of FIG. 1; and FIG. 4 is a cross-sectional view taken substantially along the line 4—4 of FIG. 1.

Figures 1, 2:
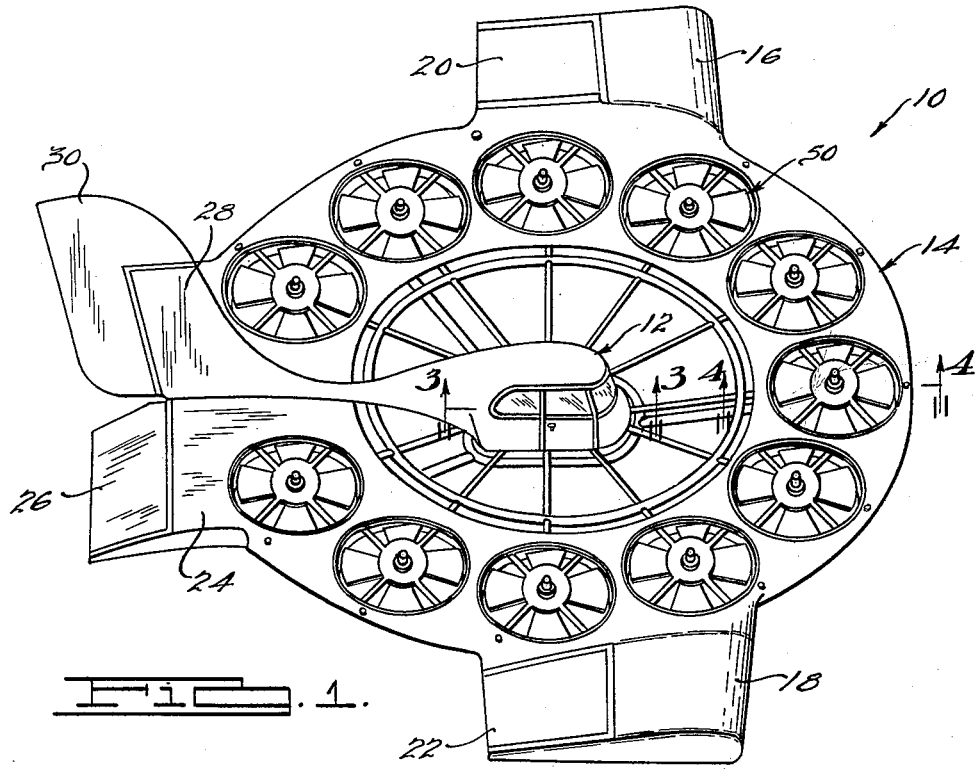
FIGURE 1 is a perspective view of one embodiment of the present invention.
FIG. 2 is a perspective view of another embodiment of the present invention.

An aircraft 10, in accordance with an exemplary embodiment of the present invention, comprises a fuselage or control center 12 disposed centrally of a generally circular body or platform 14. The platform 14 may be provided with laterally extending aerofoils 16 and 18, conventional ailerons 20 and 22 and a conventional horizontal stabilizer 24 with elevators 26, if desired, to aid in stabilizing the aircraft 10 in horizontal flight, it being understood that both ascent of the aircraft 10 and horizontal flight thereof may be accomplished without reliance on these structures. A vertical stabilizer 28 having a movable rudder portion 30 may also be provided to effect stability during horizontal flight of the aircraft 10.

In accordance with the present invention, the aircraft 10 has a plurality of rotors 50 spaced circumferentially about the platform 14. The rotors 50 are similar to one another and for the purpose of clarity, only one will be described hereinafter.

As best seen in FIG. 4, each rotor 50 comprises a generally vertically extending rotor shaft 52 that is journaled in a pair of axially spaced bearings 54 and 56. The bearings 54 and 56 are supported by upper and lower lateral support members 58 and 60, respectively. The rotor 50 has, for example, four blades 64, 66, 68 and 70 that are supported for rotation by the shaft 52 between the bearings 54 and 56. A lower end portions 72 of the shaft 52 extends into a suitable gear box 74 that transmits the rotation of a horizontally extending shaft 76 to the vertically extending shaft 52. The shaft 76 is driven by a conventional gasoline-powered engine 80 through a suitable flexible coupling 82.

The rotor 50 is enclosed in a generally cylindrical duct 90 which shrouds the rotor 50 to raise the efficiency thereof in producing thrust. It is to be understood that the duct 90 and cross sectional configuration of the platform 14 may be varied to suit particular requirements or specifications. The duct 90 is secured to the platform 14 as by riveting or welding. A fuel supply tank 92, having suitable fuel lines 94 leading to the engine 80, is disposed radially outwardly of the rotor 50 to supply fuel to the engine 80.

The annular platform 14 is connected to the control housing 12 as by a plurality of tubular members 100 that extends radially outwardly from the enclosure 12 and are secured thereto as by a plurality of bolts 102. The tubular members 100, in addition to structurally supporting the housing 12 with respect to the platform 14, provide a conduit for the passage of a motor and flight-control mechanism, to be described.

Control of the aircraft 10 is effected by varying the throttle setting of selected ones of the motors 80 thereby to vary the thrust of associated ones of the rotors 50 by varying the mass flow of air therethrough.

Each of the engines 80 has a throttle arm 110 that is biased to an idle position by a spring 112. A flexible cable 114 is connected to the throttle arm 110 in such a manner that a pull on the cable 114 effects counter-clockwise movement of the arm 110, as seen in the drawing, thereby increasing the power setting of the engine 80 and therefore the thrust of the rotor 50.

The control wires 114 extend through the conduit members 100 into the enclosure 12 and are threaded through a plurality of pulleys 120, one of which is provided for each wire 114. The wires 114 then extend vertically upwardly for connection to a throttle plate 124 that is fixed to a cylindrical bushing 126. A shaft 130 extends vertically through the bushing 126 for the support thereof, a lower end portion 132 of the shaft 130 supporting a lower bushing 134. The bushing 134 supports the pulleys 120. A ball 140 is secured to the shaft 130, and is supported for rotation about all axes by a suitable ball retainer 142. The ball retainer 142 is supported with respect to the enclosure 12 as by a bracket 144 that is secured to a rigid supporting structure or instrument panel 146. An upper end portion 147 of the shaft 130 extends above the ball 140 to provide a handle to facilitate movement of the shaft 130 and ball 140 with respect to the ball support 142.

An initial throttle setting of the motors 80 is effected by a mechanical linkage 150 comprising a hand throttle control 152 that is connected to a shaft 154 and bellcrank 156. Rotation of the hand throttle 152 about the axis of the shaft 154 is transmitted by the bellcrank 156 to a throttle link 158 which is rotatably coupled thereto as by a pin 160. Therefore, movement of the bellcrank 156 in the clockwise direction, as seen in the drawings, pulls the link 158 upwardly thereby effecting clockwise rotation of a lower bellcrank 162 about its pivotal support 164. Clockwise rotation of the bellcrank 162 effects upward movement of an arm 166 and therefore clockwise movement of an arm 168 about its pivotal support 170.

The arm 168 is engageable with a flange 174 on the bushing 126 to translate clockwise rotation of the arm 168 into vertical movement of the bushing 126 and plate 124 with respect to the shaft 130 thereby to simultaneously pull the respective wires 114 about the pulleys 120 and through the conduits 100 in equal increments, to bias the respective throttle arms 110 to an initial setting. This initial throttle setting is provided to adjust the engines 80 to an optimum running condition and to effect the desired vertical thrust necessary to lift the aircraft 10 off the ground. Subsequent variations in the output thrust of the rotors 50 effect lateral movement of the aircraft 10, in a manner to be described. It is to be noted that the engagement of the arm 168 with the flange 174 on the bushing 126 does not restrict transverse movement of the shaft 130 and bushing 126.

Horizontal movement of the aircraft 10 is effected by varying the relative effective thrust of diametrically opposed ones of the engines 80. For example, forward movement of the aircraft 10 is effected by increasing the thrust of the engines 80 rearwardly of a transverse axis extending through the center of gravity of the aircraft 10 while concurrently decreasing the thrust of the engines 80 disposed forwardly of the transverse axis. Such variations in thrust are accomplished by varying the throttle setting of the motors 80, which, in turn, is accomplished by rearward movement of the upper end portion 147 of the control shaft 130 about the support 142. Rearward rotation of the shaft 130 about its support 142 effects forward movement of the bushing 126 and plate 124 thereby decreasing the throttle setting of the forwardly disposed engines 80, by permitting the throttle arm 110 to rotate clockwise with respect to its associated motor 80 under the bias of the operating spring 112, and simultaneously, increasing the throttle setting of the diametrically rearwardly disposed engine 80 due to the pull exerted on their associated throttle arms 110 through the cables 114 connected to the plate 124. This differential in throttle setting of the fore and aft engines 80 varies the effective thrust thereof. The aircraft 10 therefore tends to rotate under the resultant torque about a transverse axis extending through its own center of gravity. When a desired orientation of the aircraft is achieved, the shaft 130 is centered, the now present horizontal component of thrust of each rotor 50 tending to move the aircraft horizontally with respect to the surface of the earth. The aircraft 10 is movable in any direction with respect to the center of gravity thereof by effecting the aforementioned thrust differential along any desired vector with respect to the center of gravity.

Referring to FIG. 2, a modified aircraft 200 is shown having a generally annular platform 202 for the support of a plurality of circumferentially spaced rotors 204. A control enclosure 206 is supported centrally of the platform 202 as by a plurality of radially outwardly extending supports 208. The control mechanism for the rotors 204 is similar to the control mechanism of the aircraft 10 discussed hereinbefore, lateral movement of the aircraft 200 being effected in a similar manner by orientating the aircraft to effect a horizontal thrust component.

What is claimed is:
1. An aircraft movable under its own power in any direction with respect to the center of gravity thereof comprising a body, at least three rotors supported by said body in spaced relation about the center of gravity thereof, each of said rotors having an individual power supply and a vertical component of thrust, and control means for varying the thrust of one of said rotors on one side of the center of gravity of said aircraft relative to the thrust of another of said rotors on the opposite side of the center of gravity thereof to rotate said body about a body axis extending through the center of gravity of said body and generally normal to the axes of said rotors to a position wherein the thrust of said rotors respectively, has a horizontal component with respect to the gravitational vertical in a direction normal to said body axis, said control means comprising a plurality of speed control linkages extending from said rotor power supplies, respectively, and connected to a common member, means for moving said common member in one direction to effect like variations in the speed of said individual power supplies, respectively, and means for moving said member in another direction to increase the speed of one of said power supplies and concomitantly decrease the speed of another of said power supplies on the opposite side of the center of gravity of said aircraft.

2. An aircraft movable under its own power in any direction with respect to the center of gravity thereof comprising a body, at least three rotors supported by said body in spaced relation about the center of gravity thereof, each of said rotors having an individual power supply and a vertical component of thrust, and control means for varying the thrust of one of said rotors on one side of the center of gravity of said aircraft relative to the thrust of another of said rotors on the opposite side of the center of gravity thereof to rotate said body about a body axis extending through the center of gravity of said body and generally normal to the axes of said rotors to a position wherein the thrust of said rotors respectively, has a horizontal component with respect to the gravitational vertical in a direction normal to said body axis, said control means comprising a plurality of speed control linkages extending from said rotor power supplies, respectively, and connected to a common member, a manually operable linkage moving said member in one direction to effect like variations in the speed of said individual power supplies, respectively, thereby to effect a base power setting and a directional control member for moving said common member in another direction to increase the speed of one of said power supplies and decrease the speed of another of said power supplies on the opposite side of the center of gravity of said aircraft.

References Cited in the file of this patent

UNITED STATES PATENTS

| | | |
|---|---|---|
| 984,269 | Friedel | Feb. 14, 1911 |
| 1,447,584 | Zahn | Mar. 6, 1923 |
| 2,939,654 | Coanda | June 7, 1960 |
| 3,008,524 | Kaplan | Nov. 14, 1961 |

OTHER REFERENCES

Popular Mechanics magazine, July 1957, vol. 108; No. 1, pages 74–77.

Aviation Week magazine, Jan. 26, 1959, pages 56–58.